United States Patent
Robinson

(10) Patent No.: US 6,726,264 B2
(45) Date of Patent: Apr. 27, 2004

(54) NON-INVASIVE SELF-CLEANING WEED EXTRACTOR TOOL

(76) Inventor: Francis E. Robinson, 873 Juneau St., Elko, NV (US) 89801-4137

( * ) Notice: Subject to any disclaimer, the term of this patent is extended or adjusted under 35 U.S.C. 154(b) by 0 days.

(21) Appl. No.: 10/165,694

(22) Filed: Jun. 6, 2002

(65) Prior Publication Data

US 2003/0227185 A1 Dec. 11, 2003

(51) Int. Cl.$^7$ ................................................ A01B 1/16
(52) U.S. Cl. ........................................... 294/50; 294/60
(58) Field of Search ........................... 294/49, 50, 50.5, 294/50.6, 50.7, 50.8, 60; 172/21, 22, 371, 381; 254/132

(56) References Cited

U.S. PATENT DOCUMENTS

| | | | | |
|---|---|---|---|---|
| 110,211 A | * | 12/1870 | Davis | 111/101 |
| 1,619,856 A | | 3/1927 | Davis | |
| 1,692,436 A | * | 11/1928 | Deane | 111/101 |
| 1,931,773 A | | 10/1933 | Sobol | 55/65 |
| 2,030,770 A | * | 2/1936 | Smith | 294/50.5 |
| 2,349,621 A | | 5/1944 | Hardman | 254/132 |
| 2,635,001 A | * | 4/1953 | Slinkman | 294/50.5 |
| 3,149,873 A | * | 9/1964 | Mockabee | 294/50.5 |
| 3,210,112 A | * | 10/1965 | Glynn | 294/50.7 |
| 3,273,930 A | * | 9/1966 | Gottfriend | 111/101 |
| 3,444,938 A | * | 5/1969 | Ballmann | 111/101 |
| 4,715,634 A | * | 12/1987 | Mueller et al. | 294/50.5 |
| 4,832,132 A | * | 5/1989 | Barcelon | 172/371 |
| 4,930,825 A | | 6/1990 | Dearman | 294/50.9 |
| 5,188,340 A | | 2/1993 | Green | 254/132 |
| 5,234,241 A | | 8/1993 | Ikerd | 294/50.8 |
| 5,257,666 A | | 11/1993 | Townsend, Jr. | 172/25 |
| 5,330,010 A | | 7/1994 | Smotherman | 172/25 |
| 5,452,767 A | | 9/1995 | Smotherman | 172/25 |
| 5,456,449 A | | 10/1995 | Smith | 254/132 |
| 5,609,325 A | | 3/1997 | DeArmond | 254/132 |
| 5,765,648 A | | 6/1998 | Sheehan et al. | 172/381 |
| D410,269 S | | 5/1999 | Byrd | D21/793 |
| 5,964,451 A | | 10/1999 | Sudheimer | 254/132 |
| 6,016,876 A | | 1/2000 | Rountree et al. | 172/378 |
| 6,044,914 A | | 4/2000 | Johnson | 172/377 |
| 6,257,346 B1 | | 7/2001 | Schofield et al. | 172/381 |
| 2001/0045293 A1 | | 11/2001 | Tam | 172/378 |

* cited by examiner

Primary Examiner—Dean J. Kramer
(74) Attorney, Agent, or Firm—Pedersen & Co., PLLC; Ken J. Pedersen; Barbara S. Pedersen

(57) ABSTRACT

A garden and lawn weed extractor tool enables removal of the weed with minimal invasiveness to the soil or turf. The weed extractor tool utilizes a foot-operated depression feature to insert the tool blade into the soil, at an angle to horizontal near the weed root. The user then uses the tool as a lever to pivot the blade relative to the weed root, which loosens the soil around the root and, hence, loosens the weed from the ground so that the weed is removable without carrying with it a large clump of soil. A spring-assisted soil retainer device and self-cleaning mechanism wipes or scrapes the tool blade as the tool is removed from the ground, and, in doing so, retains most of the soil in place at or near its original location. The tool, therefore, tends to prevent disruption to the garden and turf area, leaves each weed-removal site neat and miminally-disturbed, and keeps the tool blade clean for smooth and quick insertion at the next weed-site.

25 Claims, 4 Drawing Sheets

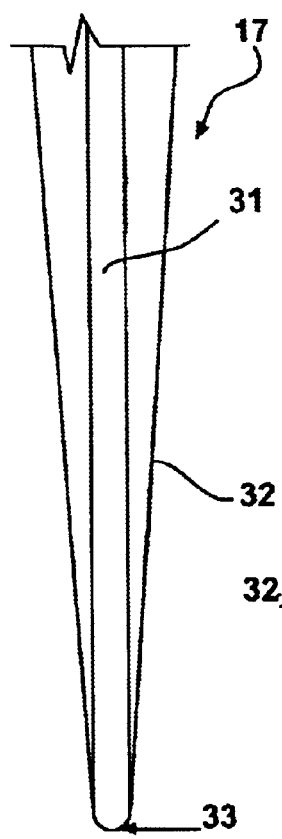
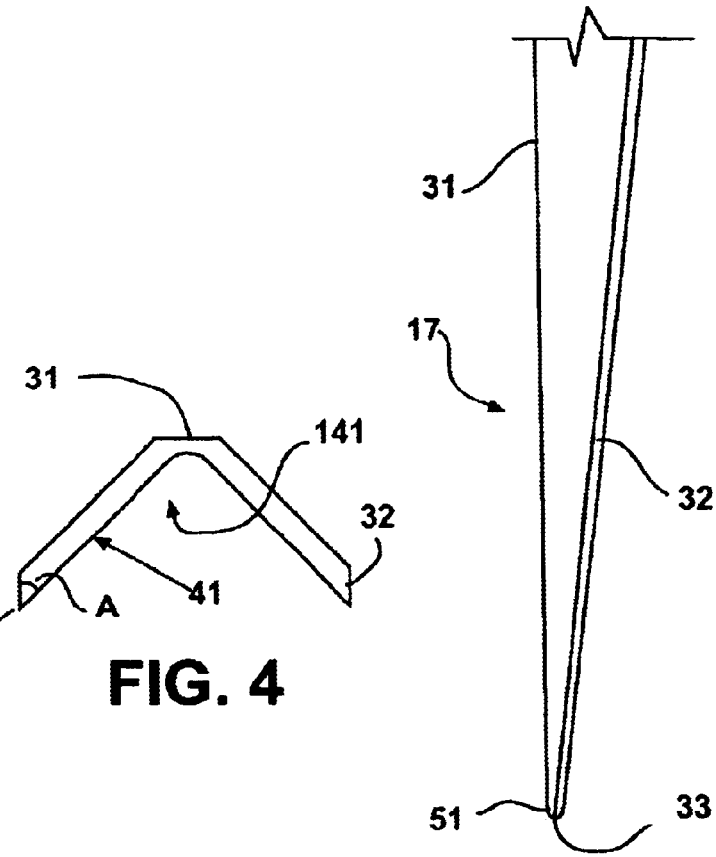
FIG. 4
FIG. 3
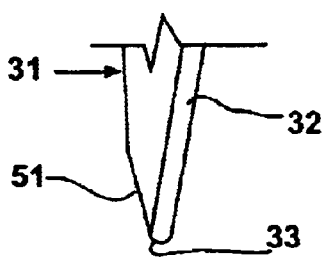
FIG. 5
FIG. 6

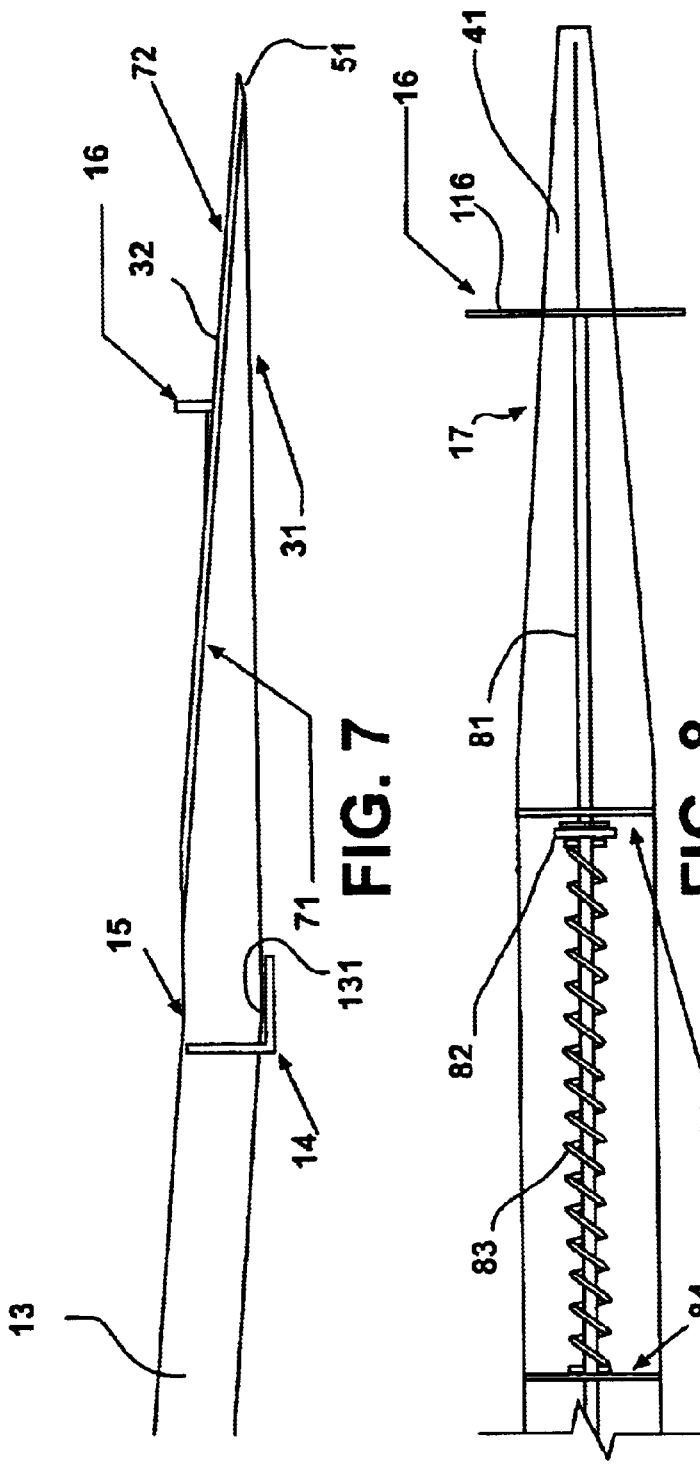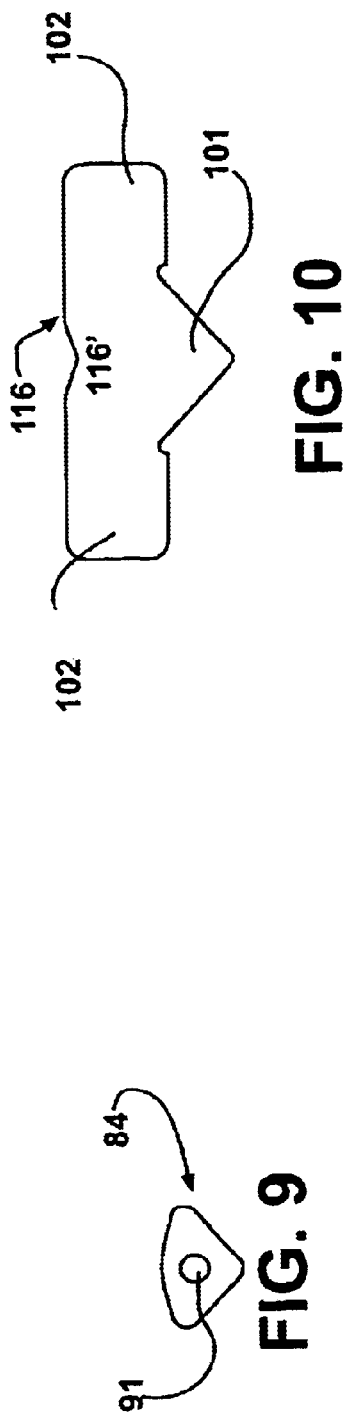

NON-INVASIVE SELF-CLEANING WEED EXTRACTOR TOOL

BACKGROUND OF THE INVENTION

1. Field of the Invention

This invention relates generally to a garden and lawn weed remover tool that enables more complete removal of the weed with minimal invasion into the soil or turf. More specifically, the invention relates to a triangular, "V" or "L" shaped pointed blade that pierces the earth adjacent to the root of a weed, where the blade is driven when a user pushed on attached foot operated cross member. Once inserted into the ground, the shaft of the remover tool is used as an angled lever to provide mechanical advantage to the blade to leverage the weed root and loosen it for easy removal. As the blade is removed, a spring-loaded clearing mechanism removes earth and debris from the blade, leaving the earth to its original position.

2. Related Art

Weed removal tools, such as garden trowels, forked-handheld digging devices and footstep removal mechanisms, have long been used to remove weeds from lawns and gardens. Numerous varieties of these tools are found in literature and in the marketplace. Sobol (U.S. Pat. No. 1,931,773) describes a handheld digging fork used to remove dandelions, where the user is positioned close to a dandelion to insert a handheld fork-tipped bar into the ground adjacent to the dandelion root to loosen the soil and enable removal of the weed. Alternatively, Green (U.S. Pat. No. 5,188,340) teaches a weed extraction device that uses a step operation while standing, similar to using a shovel, to insert a coring device that is then twisted to cut a cone shaped plug around the weed for removal.

A weed removal tool is described by Tam (U.S. Pub. No.: US 2001/0045239 A1) that includes a telescoping handle attached to a combination footstep and fulcrum arm to enable insertion of a blade in the ground. The blade has a notched fork-style end. When the handle is moved backward, the footstep arm moves back against the top of the ground and acts as a fulcrum to enable leverage on the blade by moving the handle backward. The leveraging action enables the forked tip of the blade to grasp the weed root and scoop the weed forward up out of the ground. In each of these examples, should dirt adhere to the blade, the user must scrape the blade against another object or with another, separate tool, and return the removed soil to its original location.

Until now, of the many examples of weed removal tools that exist today, none have the properties for noninvasive complete removal of the weed, while being easy to use and self-cleaning.

SUMMARY OF THE INVENTION

In accordance with the present invention, a weed extractor device includes a blade shaped and angled so that, when pushed into the ground by use of a foot platform, the blade surrounds the root of a weed on at least on two sides and angles inward toward the root for a minimum of disturbance to the ground. The invented device further comprises a dual-function blade cleaning and soil-retaining mechanism, and preferably has an angled handle for improved comfort and leverage by the user. The main body of the tool is a shank length that may have a cross section similar to a "V" or "L" or "U" that preferably transitions smoothly into the "V" or "L" or "U" shaped blade, wherein such blade shapes fall within the general category of a "curved" shape that defines a space for receiving the weed and its root and a small amount of dirt around the root. The blade "curve" is preferably a curve from side edge to side edge. While the blade is preferably attached to the main body of the tool at an angle that assists in insertion of the blade into the soil at an angle, the blade is most preferably straight along its spine, that is, without a blade curve in the longitudinal direction as such a longitudinal curve could interfere with smooth, low-resistance insertion into the ground.

According to the current invention, the weed extractor tool is used to remove a wide variety of weed and its root, with minimal disturbance to the surrounding soil and turf. The blade cleaning mechanism reduces the buildup of soil and turf on the blade that will otherwise create a larger hole and holds loose soil in place during removal of the tool from the ground, resulting in less disturbance of the soil.

According to the current invention, the point of the weed extractor is placed near the center of the weed, and the foot-operated cross member is depressed to insert the blade point into the earth adjacent to the weeds' root. The blade cleaning mechanism abuts the earth top surface, where its spring-loaded backing is compressed as the blade enters the ground. The handle is pulled back a short distance to leverage the blade and induce the soil and weed to rise upward a finite distance into a mound. The entire or substantially the entire weed may be lifted out of the loosened dirt mound. Then, the tool may be entirely lifted out of the loosened mound. As the tool is removed from the mound, the blade cleaning mechanism scrapes the blade clean, driven by the compressed spring, thus inducing the soil to remain in place with minimal disturbance to the weeded area.

Thus, the tool may be seen as a weed loosening, rather than a digging, device, because a minimum of dirt is disturbed, and even less is lifted up out of its original place in the ground. The invented tool works on the theory that it is better to loosen the root from the dirt and lift the root from the ground, than to dig up a large plug of dirt with the weed in it. This reduces the disturbance to the ground and surrounding plants, and results in a pulled weed that does not have a large clod of dirt on the root. Consequently, the user does not have to refill large holes, does not have to shake the weed or hit it against another object to try to dislodge the dirt before disposing of the weed. Thus, all the way around, this is a lower-impact a lower-effort weed removal system than prior art approaches.

The invention and objects and features will be more readily apparent from the following description and dependent claims when taken with the drawings.

BRIEF DESCRIPTION OF THE DRAWINGS

FIG. 3 is an enlarged detail back view of the non-invasive weed extractor tool blade.

FIG. 4 shows a cross section view of the blade profile of the blade of FIG. 3

FIG. 5 is an enlarged detail side view of the blade of FIGS. 3 and 4.

FIG. 6 is an enlarged detail side view of the tip of the blade of FIGS. 3–5.

FIG. 7 is an enlarged detail side view of the blade and blade cleaning mechanism portion of the weed extractor tool of FIGS. 1–6.

FIG. 8 is an enlarged detail front view of the blade and blade cleaning mechanism portion of the weed extractor tool of FIGS. 1–7.

FIG. 9 is a detail view of one embodiment of the blade cleaning mechanism shaft support.

FIG. 10 is a detail view of one embodiment of the blade cleaning mechanism scraper and soil retainer.

DESCRIPTION OF THE PREFERRED EMBODIMENTS

Figure 1:
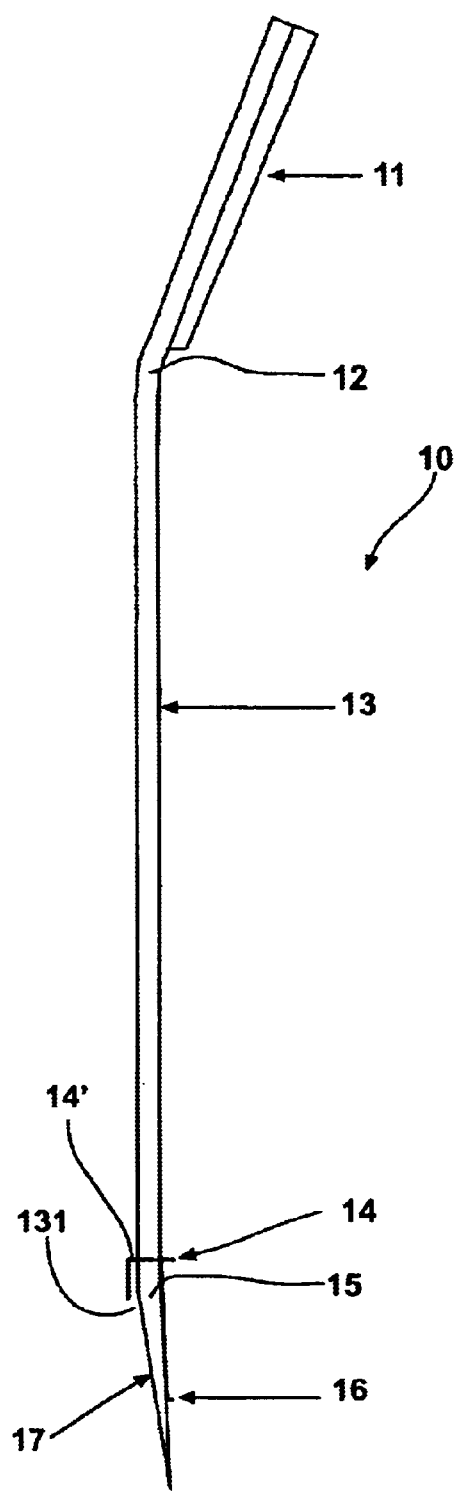
FIG. 1 illustrates a side view of an improved non-invasive weed extractor tool in accordance with one embodiment of the invention.

Referring now to the drawings, FIG. 1 illustrates a side view of an improved non-invasive weed extractor tool 10 in accordance with one embodiment of the invention, with the blade cleaning mechanism and soil retainer 16 in its neutral position. The weed extractor tool 10 includes a handle 11 attached at an angle 12 to shank 13, wherein shank 13 supports the "foot operated" cross member 14 (also called "foot platform" or "step"), a blade 17 set at an insertion angle 15, and the blade cleaning mechanism and soil retainer 16.

Also shown to best advantage in FIG. 1 is the position of cross member 14, which the user pushes with his foot to force the tool blade 17 into the ground. The cross member 14 preferably comprises a top platform surface 14' against which the foot pushes, which is perpendicular to the axis of the blade. This way, the force exerted on the platform surface 14' directs the blade directly and efficiently into the soil with the point of the blade directed downward and inward at the plant root, without a significant tendency for the blade to twist or turn or rotate when entering the soil. Combined with other preferred features of the tool 10, this contributes to accurate placement and insertion of the tool while minimizing disruption of the soil. The preferred cross member 14 is long enough to extend to the right and left of the shank for either right or left foot use.

Figure 2:
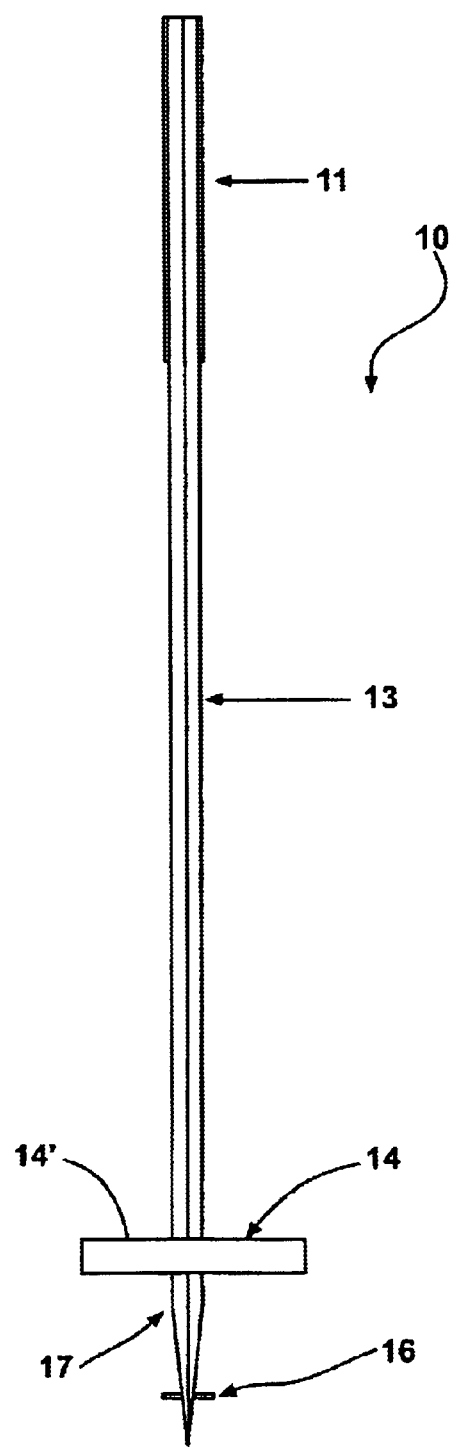
FIG. 2 is a back view of the non-invasive weed extractor tool of FIG. 1.

FIG. 2 shows the weed extractor tool 10 of FIG. 1 in a back view where handle 11 is co-planar with shaft 13 and generally perpendicular to cross member 14. The plate 116 of the blade cleaning mechanism and soil retainer 16 is shown to extend normal to the blade 17.

FIGS. 3–5 illustrate to best advantage the preferred blade 17 of the tool 10. Blade 17 extends from shank 13 generally coaxilly, but at a slight angle forward (right in FIG. 1) from the shank 13. Thus, both the handle 11 and the blade 17 are preferably slightly angled forward from the shank. The handle is about 15–25 degrees forward from the shank, or whatever is comfortable for a user to hold and pull back on. Having the handle 11 at an angle or curving relative to the preferably straight shank makes it more comfortable for the user to hold and use the tool 10, for example, because the user's hand can remain at a comfortable distance in front of the user both when inserting the tool into the ground and when pulling back on the handle to remove the weed. The blade 17 is preferably positioned about 5–20 degrees forward from the shank, and more preferably about 5–10 degrees forward from the shank. This angle of the blade relative to the shank longitudinal axis, is the "insertion angle 15," and, practically, is measured by the angle of the back surface 31 to the axis of the shank 13. This preferred angle tends to move the blade down and in against the weed root, when the tool is pushed into the ground. The three main portions, handle 11, shank 13, and blade 17 are all preferably coplanar (the plane of the paper in FIG. 1).

FIG. 3 is an enlarged detail back view of the blade 17. When the tool blade 17 is inserted into the ground, flat surface 31 abuts against the rear wall of the small hole cut by the blade, and a top portion 131 of surface 31 serves as a pivot point when the tool handle is pulled back by the user, so that the blade 17 pivots forward and upward the root. The preferred blade shape and pivotal tool action, therefore, tend to make a cone-shaped cut in the dirt, tapering inward toward the root, which minimizes the size of the hole made by insertion and movement of the blade 17.

As illustrated in FIGS. 3–6, cutting edge 32 extends all along the blade side surface of 17. The bottom end of the blade 17 is shaped as described in detail below, featuring a sharp rear angled surface 51 to help with smooth insertion into the ground with a minimum of foot pressure against the cross member 14. The bottom end of the blade 17 also has a rounded tip 33 for improved safety, so that the blade is designed to compromise between thinness (for excellent insertion into the ground) and a rounded tip (to prevent the tool from having a dangerous spear-like sharpness).

FIG. 4 illustrates a transverse cross section of the blade 17, which shows the flat surface 31 on the backside. The cutting edge 32 is shown perpendicular to the flat surface 31, but surface 32 may be differently-angled relative to the flat surface 31 to make the blade side edges even sharper for even cleaner forward cutting of the earth.

In use, the blade slides smoothly into the ground when the user pushes on the cross member 14, due to the thinness of the blade and the bottom end of the blade (aided by sharp rear angle 51), and the sharpness of the cutting edges 32. The cross member 14 is preferably rigidly and non-movably connected to the shank or other portion of the tool so that it is adapted to transmit the force of the foot to the tool and to the blade, and so that it is not positioned where it will interfere with the blade sliding fully into the ground. During insertion of the blade into the ground, the blade "inner" or "front" surface 41 moves down and forward generally along the weed root, so that, by the time the blade is fully inserted into the ground, the inner surface 41 curves part way around the weed root plus a small amount of soil, in effect, receiving the weed root plus that small amount of soil in the blade's front interior space 141 defined and partly surrounded by the inner surface 41. After insertion, the user pulls back on the blade to pivot the blade, and the cutting edges 32 cut forward through the dirt, and the blade inner surface 41 (or "front surface"), herein depicted as a V-shaped surface, moves a small plug of soil forward and upward. In doing so, the soil in the plug is loosened, and the weed root is loosened from the soil of the plug. The weed may then be lifted up out of the plug by the user, the tool may be removed up and away from the plug, and the user may step on the plug to tamp it back into place in the ground.

FIGS. 5 and 6 are side views of the blade, illustrating the relation between the flat surface 31 and cutting edge 32 is illustrated. The flat surface 31 on the back of the blade 17 ends with a sharp angle 51 that tapers to the rounded tip 33 at the terminating end of the cutting edge 32.

FIG. 7 is a side view of the lower portion of the tool, which illustrates to best advantage the vertex of the insertion angle 15 near the cross member 14, and the blade tapering down toward the bottom to slant the cutting edges 32 close to the rear flat surface 31. Thus, the flat surface 31 terminates in sharp angle 51 generally at the blade tip 33. Preferably, the blade 17 has only a single tip, that is, the blade is not a "forked" blade or a multi-pointed blade, but rather narrows to the single tip that is efficient at entering the ground and traveling toward the root. In FIG. 7, the blade cleaning mechanism and soil retainer 16 is in the neutral position, as it is prior to insertion into the ground, and one may see in FIG. 7 the retainer plate 116 perpendicular to the paper.

FIG. 8 shows an enlarged front view of the lower portion of the tool, showing to best advantage the blade cleaning mechanism and soil retainer 16. As the blade 17 is inserted in the soil, the soil retainer plate 116, attached to the support shaft 81, buttresses against the top surface of the soil and moves the support shaft 81 upward. Affixed to the support shaft 81 is a spring retainer 82, which abuts the compression spring 83, where the compression spring 83 is affixed to the shank 13 using spring retainer clips 84. FIG. 8 shows a front view of the blade 17 inner surface 41 in which the blade cleaning mechanism and soil retainer 16 slides during operation. As the blade 17 is inserted in the soil the blade cleaning mechanism and soil retainer 16 remains on the soil surface to retain the soil near its original location to minimize the tools impact on the soil or turf as the weed is removed. When the tool 10 is removed from the ground, the spring 83 biases the soil retainer plate 116 to slide toward the tip of the blade, and, in doing so, it tends to scrape soil off of the blade inner surface 41 and/or hold the soil within the space defined by the inner surface 41 generally in place in the ground, preventing that soil from being removed from the ground by the tool. This way, the preferred soil retainer system 16 serves both to clean the blade and to retain the soil in the most desirable location, that is, in the ground generally at its original location.

FIG. 9 illustrates a front view of a spring retainer clip 84, where the support shaft 81 is channeled through the support shaft port 91. The preferred shaft 81 extends axially along a portion of the shank 13 in a lower area of the shank that contains the clips 84, retainer 82, and spring 83, and is adapted to extend axially along a substantial portion of the blade 17 for the cleaning and soil retaining functions. While the Figures illustrate the shaft 81 and plate 116 extending as far as about ⅔ of the way down the blade in the neutral (non-compressed spring) position, the tool 10 may be designed to allow the shaft and plate to extend to different locations in the neutral position, for example, to locations in the range of ½–⅞ of the way down the blade. While the shaft and plate may be designed to travel all the way to the tip of the blade, this is not normally necessary to accomplish good blade cleaning. To assist in the travel of the shaft 81 and plate 116, the shaft is preferably slightly curved from its portion near the spring 83 to its portion near the plate 116, to allow it to travel smoothly from the shank area to the blade area and to travel smoothly down the blade with the plate urged against the inner surface 41, but not binding or stuck on the inner surface 41.

FIG. 10 shows a front view of the blade cleaning mechanism scraper and soil retainer plate 116. Shown are the soil retainer tabs 102 and the blade cleaning mechanism scraper 101, where the soil retainer tabs 102 press against the soil surface and the blade cleaning mechanism scraper portion 101 has a edge profile that matches the inner surface 41 for effective cleaning. Preferably, the plate 116 has a generally flat lower surface 116' of dimensions that properly press on and retain the loosened soil, for example, about 2–3 inches long by about 1–2.5 inches wide at the scraper portion area. Thus, the plate lower surface 116' preferably has a surface area in the range of about 2–5 square inches, and preferably in the range of about 3 square inches, providing enough surface area to push on and retain the loosened dirt in the ground, whether or not is has tended to stick to the blade.

Figure 11B:
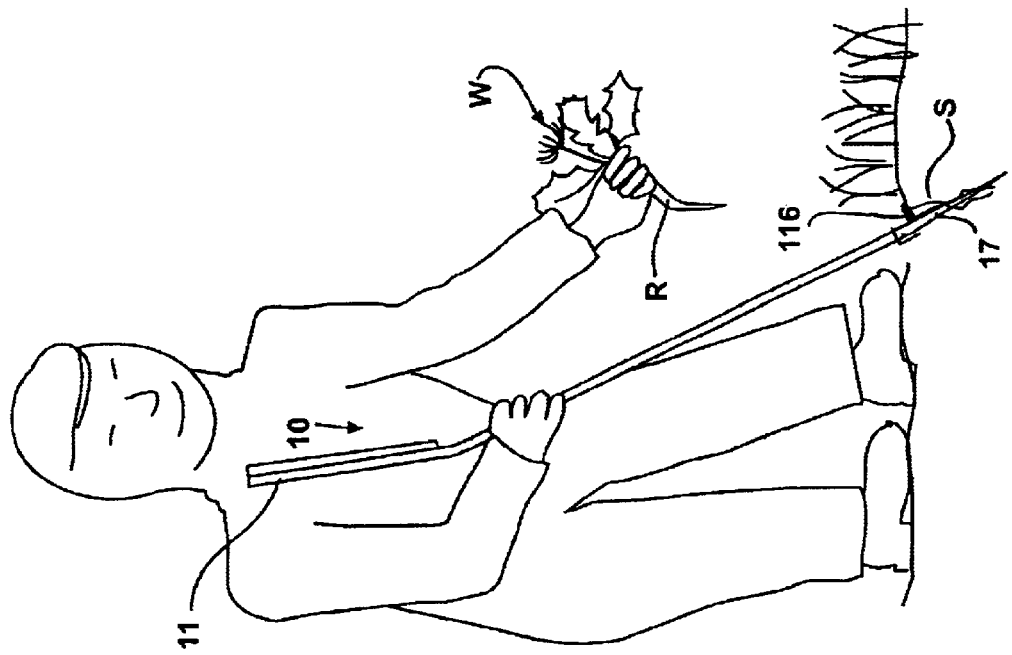
FIG. 11B illustrates the embodiment of FIGS. 1–11A being pulled up out of the ground, retaining the soil substantially in place after weed removal.
Figure 11A:
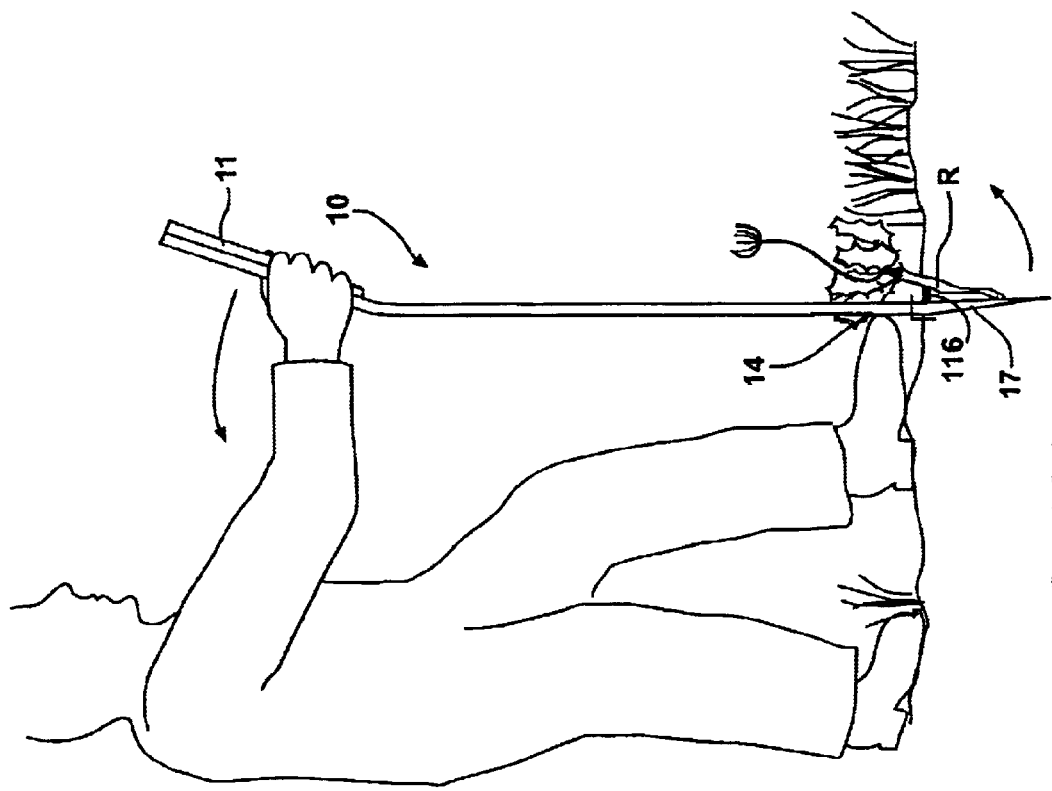
FIG. 11A illustrates the embodiment of FIGS. 1–10 inserted into the ground and being pulled to pivot the blade forward generally beside and under the root.

FIGS. 11A and 11B illustrate the preferred embodiment of the tool 10 in use during some of the preferred steps of weed removal. In FIG. 11A, the user has pushed down in the cross member 14 to insert the blade 17 down and toward the weed root R. The user is beginning to pull back on the tool handle 11 so that the blade loosens and lifts a small amount of soil S (which may be described as generally a small conical volume of soil that has about the same diameter as or preferably slightly larger than the diameter of the blade curved surface. With the pivoting action of the tool, the weed root is loosened from the soil enough for the user to lift up the weed. In FIG. 11B, the user has removed the weed and is about to begin removing the tool from the ground. In FIGS. 11A and B, the cleaning and retaining plate 116 is shown in its retracted or "upper" position, wherein it has been pushed upward due to the tool being pushed into the ground, and wherein it is pressing on the ground near the weed and thereby assisting in retaining the soil generally in place. This way, the conventional large pile or plug of dirt that is removed by conventional shovels or weed removers is not created. When the tool is removed, the cleaning and retaining system 16, and particularly the plate 116, moves down from its position in FIGS. 11A and B to "scrape" the blade and to continue to push on the soil, until the tool is lifted so high that the plate is at its lowermost position on the blade and there is no more force against the soil. This to retain it generally in its original location. As a preferred final step, the user may press on the loosened soil with his/her foot to press it back down into proper position in the ground and into the space vacated by the weed, thus, leaving a neat but weed-free spot where a weed had been growing.

The invented weed extractor tool 10 can be used to remove weeds from many different types of soil, such as clay-like soil, wet sticky soil, dry sandy soil, or what is known as "loose soil." An important feature of the tool 10 that contributes to this versatility is the blade or point scraping system that stops buildup of soil on the blade and its point. Such a buildup, if not removed, tends to enlarge the hole created in the soil, and, hence, the disruption of the soil.

While the invention has been described with reference to a specific embodiment, the description is illustrative of the invention and is not to be construed as limiting the invention. For example, the inner surface 41 can be an "L" or a "U" shape and still support a cutting edge 32. Additionally, the compression spring 83 can be an extension spring or elastic material or of a compressible material that rebounds to a neutral position. Alternatively, the foot operated cross member 14 can be any platform feature and the soil retainer tabs 102 can be made of a crossbar configuration. Cutting edge 32 can be smooth, toothed or serrated. Various other modifications and applications may occur to those skilled in the art without departing from the true spirit and scope of the inventions defined by the independent claims.

Although this invention has been described above with reference to particular means, materials and embodiments, it is to be understood that the invention is not limited to these disclosed particulars, but extends instead to all equivalents within the scope of the following claims.

I claim:

1. A weed extractor tool comprising:
   a top end and a bottom end and a longitudinal axis between said top and said bottom end;

a soil penetration blade at said bottom end, the blade having a blade upper end and a blade lower end;

a cleaning mechanism movably connected to said bottom end of the tool and being movable from near said blade upper end to near said blade lower end for cleaning soil off of the blade, wherein, when the blade is pushed into the ground, the cleaning mechanism moves up the blade to near the blade upper end; and a biasing mechanism connected to the cleaning mechanism adapted to bias the cleaning mechanism toward the blade lower end so that, when the blade is removed from the ground, the biasing mechanism forces the cleaning mechanism toward the blade lower end to remove soil from the blade;

wherein the blade has a generally-V-shaped front surface, and said cleaning mechanism comprises a cleaning plate that slides along said front surface when said cleaning mechanism is forced by said biasing mechanism toward the blade lower end; and wherein said cleaning plate has a generally flat lower surface perpendicular to the longitudinal axis of the tool, and a scraping portion with generally V-shaped outer perimeter edge that slides along the V-shaped front surface of the blade for said removing of the soil from the blade.

2. The tool of claim 1, wherein the biasing mechanism comprises a shaft parallel to said longitudinal axis, said plate attached to the shaft perpendicular to the shaft, and a spring biasing the shaft to move toward the blade lower end to force the plate toward the blade lower end for said removing of soil from the blade.

3. The tool of claim 1, wherein the plate lower surface has a surface area of at least three square inches and is biased by the biasing mechanism to press on the ground during insertion of the blade into the ground and to press on the ground during removal of the tool from the ground, so that soil loosened by the tool substantially remains in place in the ground.

4. A weed extractor tool as in claim 1, wherein the blade has left and right side edges and said cleaning plate comprises left and right soil retainer tabs that extend out beyond said left and right side edges.

5. A weed extractor tool comprising:

a main body having top end and a bottom end and a longitudinal axis between said top and said bottom end;

an elongated blade having an upper end connected to said main body, left and right side edges, a blade lower end with a tip, and a front surface curved between said left and right side edges to form a front interior space for receiving a weed root when the blade is pushed into the ground;

a cleaning mechanism comprising a soil cleaning and retaining plate movably connected to said main body and being movable from near said blade upper end to near said blade lower end for cleaning soil off of the blade;

a biasing mechanism that biases said plate toward the blade lower end so that, while the blade is being pushed into the ground, the plate abuts against the ground and presses on the ground while the plate moves up the blade to near the blade upper end, and so that, while the blade is being removed from the ground, said biasing mechanism forces the plate toward the blade lower end to remove soil from the blade; and a handle near the top end of said main body, wherein said handle is an elongated handle with a handle longitudinal axis and said handle extends forward from said main body longitudinal axis at an angle in the range of 15–25 degrees from said main body longitudinal axis.

6. The tool of claim 5, wherein the blade has a longitudinal axis, and the tool further comprising a foot platform having an upper surface extending out from the main body near said bottom end generally perpendicular to the blade longitudinal axis, the foot platform rigidly connected to the main body for transferring force from the user's foot to the tool.

7. The tool of claim 6, wherein the blade is connected to the main body at an angle so that the blade longitudinal axis is at an angle in the range of 5–10 degrees to the main body longitudinal axis.

8. The tool of claim 5, wherein the blade's left side edge and right side edges are sharp and extend down to said tip, wherein said tip is the only bottom tip of the blade.

9. A weed extractor tool as in claim 5, wherein said plate comprises left and right soil retainer tabs that extend out beyond said left and right side edges.

10. A weed extractor tool comprising:

a main body having top end and a bottom end and a longitudinal axis between said top and said bottom end;

an elongated blade having an upper end connected to said main body, left side and right side edges, a blade lower end with a tip, and a front surface curved between said left and right side edges to form a front interior space for receiving a weed root when the blade is pushed into the ground, wherein the left side edge and right side edge are sharp and extend down to said tip and said tip is the only bottom tip of the blade and wherein the blade, has a generally flat and straight rear surface extending from the blade upper end to the blade lower end;

a cleaning mechanism comprising a soil cleaning and retaining plate movably connected to said main body and being movable from near said blade upper end to near said blade lower end for cleaning soil off of the blade;

a biasing mechanism that biases said plate toward the blade lower end so that, while the blade is being pushed into the ground, the plate abuts against the ground and presses on the ground while the plate moves up the blade to near the blade upper end, and so that, while the blade is being removed from the ground, said biasing mechanism forces the plate toward the blade lower end to remove soil from the blade.

11. A weed extractor tool as in claim 10, wherein said plate comprises left and right soil retainer tabs that extend out beyond said left and right side edges.

12. A weed extractor tool consisting essentially of:

a shank member with a top end and a bottom end and a longitudinal axis between said top and said bottom end;

a single soil penetration blade at or near said bottom end, the blade having a blade upper end and a blade lower end, the single blade extending from the shank member at an angle in the range of 5–20 degrees from said longitudinal axis;

a cleaning mechanism movable from near said single blade upper end to near said single blade lower end, and adapted so that, when the single blade is pushed into the ground, the cleaning mechanism moves up the single blade to near the blade upper end, and, when the single blade is pulled out of the ground, the cleaning mechanism is adapted to slide along and be urged against a front surface of the single blade from near said blade upper end to near said blade lower end so that the cleaning mechanism scrapes the front surface of the blade.

13. The tool of claim 12, wherein the single blade has side edges and a curved front surface between said side edges, the cleaning mechanism comprises a cleaning plate that slides along said front surface, and said cleaning mechanism comprises a biasing mechanism adapted to force the cleaning plate against and toward the blade lower end.

14. The tool of claim 13, wherein the cleaning plate has a generally flat lower surface perpendicular to the longitudinal axis of the tool, and a scraping portion with a curved outer perimeter edge that slides along the curved front surface of the blade for said removing of the soil from the blade.

15. The tool of claim 14, wherein the plate lower surface has a surface area of at least three square inches and is biased by the biasing mechanism to press on the ground during insertion of the blade into the ground and to press on the ground during removal of the tool from the ground, so that soil loosened by the tool substantially remains in place in the ground.

16. The tool of claim 13, wherein the biasing mechanism comprises a shaft parallel to said longitudinal axis, said plate attached to the shaft perpendicular to the shaft, and a spring biasing the shaft to move toward the blade lower end to force the plate toward the blade lower end for said removing of soil from the blade.

17. A weed extractor tool as in claim 12, wherein said cleaning mechanism is urged against the blade front surface from near said blade upper end down to a location in the range of ½–⅞ of the distance from the blade upper end to the blade lower end.

18. A weed extractor tool as in claim 12, wherein said cleaning mechanism comprises a biasing mechanism adapted to do said urging against the blade front surface.

19. A weed extractor tool as in claim 18, wherein said biasing mechanism comprises a spring.

20. A weed extractor tool as in claim 12, wherein the shank member comprises a handle that bends forward at 15–25 degrees from said longitudinal axis.

21. A weed extractor tool as in claim 12, wherein the blade has left and right side edges and said cleaning mechanism comprises left and right soil retainer tabs that extend out beyond said left and right side edges.

22. A weed extractor tool comprising:
a main body having a top end and a bottom end and a longitudinal axis between said top end and said bottom end;
a soil penetration blade at or near said bottom end, the blade having a blade upper end and a blade lower end and an inner surface, the blade being connected to the main body at an angle in the range of 5–20 degrees from said longitudinal axis;
a cleaning system for cleaning soil off of the blade, the cleaning system comprising a cleaning member and a shaft extending from the cleaning member and slidably mounted to the main body, said shaft being curved so that the shaft slides from the bottom end of the main body through the connection of the blade to the main body at said angle, to carry the cleaning member along the blade from near the blade upper end toward the blade lower end.

23. A weed extractor tool as in claim 22, wherein said cleaning system further comprises a spring adapted to bias said shaft to slide downward toward the blade lower end.

24. A weed extractor tool as in claim 23, comprising two retainers attached to said main body, wherein the shaft slidably extends through said retainers and said spring is held between said retainers.

25. A weed extractor tool as in claim 22, wherein the blade has left and right side edges and said cleaning member comprises left and right soil retainer tabs that extend out beyond said left and right side edges.

* * * * *